United States Patent
Freitas Cunha et al.

(10) Patent No.: US 11,157,741 B2
(45) Date of Patent: Oct. 26, 2021

(54) DETERMINING THE STATE OF INFRASTRUCTURE IN A REGION OF INTEREST

(71) Applicant: International Business Machines Corporation, Armonk, NY (US)

(72) Inventors: Renato Luiz De Freitas Cunha, São Paulo (BR); Bruno Silva, São Paulo (BR); Eduardo Rocha Rodrigues, São Paulo (BR); Ana Paula Appel, São Paulo (BR)

(73) Assignee: International Business Machines Corporation, Armonk, NY (US)

( * ) Notice: Subject to any disclaimer, the term of this patent is extended or adjusted under 35 U.S.C. 154(b) by 90 days.

(21) Appl. No.: 16/539,235

(22) Filed: Aug. 13, 2019

(65) Prior Publication Data
US 2021/0049363 A1   Feb. 18, 2021

(51) Int. Cl.
*G06K 9/00* (2006.01)
*H04W 4/029* (2018.01)

(52) U.S. Cl.
CPC ..... *G06K 9/00704* (2013.01); *G06K 9/00651* (2013.01); *H04W 4/029* (2018.02)

(58) Field of Classification Search
CPC .......... G06K 9/00704; G06K 9/00651; H04W 4/029
See application file for complete search history.

(56) References Cited

U.S. PATENT DOCUMENTS

| | | | |
|---|---|---|---|
| 9,129,355 B1 | 9/2015 | Harvey et al. | |
| 9,390,489 B1 | 7/2016 | Harvey et al. | |
| 10,032,267 B2 | 7/2018 | Strebel et al. | |
| 2009/0265193 A1 | 10/2009 | Collins et al. | |
| 2013/0176424 A1 | 7/2013 | Weil | |
| 2014/0330526 A1* | 11/2014 | Allen ................... | G01M 5/0025 702/34 |
| 2016/0167226 A1* | 6/2016 | Schnittman .......... | G05D 1/0274 382/153 |
| 2016/0171309 A1 | 6/2016 | Hay | |
| 2016/0292518 A1* | 10/2016 | Banitt ...................... | G06K 9/66 |

(Continued)

FOREIGN PATENT DOCUMENTS

| | | |
|---|---|---|
| CN | 103065470 A | 4/2013 |
| CN | 104469305 A | 3/2015 |

(Continued)

*Primary Examiner* — Christopher M Brandt
(74) *Attorney, Agent, or Firm* — Joseph Petrokaitis; Ryan, Mason & Lewis, LLP (57) ABSTRACT

A method includes confirming when a vehicle accesses a region of interest, obtaining data associated within the region of interest, and determining, based on analytics performed on the data obtained of the region of interest, whether one or more anomalies are present at the region of interest. Obtaining data includes at least one of collecting, with an imaging sensor associated with the vehicle, image data of a given point of interest within the region of interest or collecting, with a motion sensor associated with the vehicle, motion data of the vehicle in a given fragment of interest within the region of interest. The confirming, obtaining and determining steps are performed by at least one processing device comprising a processor operatively coupled to a memory.

20 Claims, 6 Drawing Sheets

(56) References Cited

U.S. PATENT DOCUMENTS

| | | | |
|---|---|---|---|
| 2016/0300341 A1 | 10/2016 | Hay et al. | |
| 2017/0103507 A1 | 4/2017 | Fuchs | |
| 2017/0358068 A1* | 12/2017 | Strebel | G01S 17/89 |
| 2018/0072313 A1* | 3/2018 | Stenneth | G08G 1/0112 |
| 2018/0151045 A1 | 5/2018 | Kim et al. | |
| 2019/0220043 A1* | 7/2019 | Zamora Esquivel | G05D 1/0011 |

FOREIGN PATENT DOCUMENTS

| | | |
|---|---|---|
| CN | 108983806 A | 12/2018 |
| EP | 3518205 A1 | 7/2019 |
| WO | PCT/IB2020/057064 | 11/2020 |

\* cited by examiner

DETERMINING THE STATE OF INFRASTRUCTURE IN A REGION OF INTEREST

BACKGROUND

The present application generally relates to detecting issues concerning public and/or private infrastructure, and more particularly, relates to a cognitive system and associated methodology for inspecting, monitoring and/or determining a state of infrastructure in various regions of interest.

Inspecting infrastructure is a complex issue that requires many resources including human, capital, and equipment. Infrastructure, including roads, buildings and other structures, in need of repair has a significant impact on the lives of the inhabitants within these regions. Conventional methodologies of inspecting infrastructure include manual inspection by employees, typically municipal or governmental employees, which is extremely time-consuming and inefficient from a cost point of view. Moreover, by the time a technical report is generated for the inspected infrastructure, it may be outdated and not reflective of the current state of the infrastructure.

SUMMARY

Illustrative embodiments of the present invention generally relate to inspecting infrastructure within regions of interest, including points of interest such as building structures and fragments of interest such as sections of roadways, with the use of data generated by imaging devices and/or sensors which may be incorporated within moving vehicles. The collected data is compared against historical data. The detection of any anomalies or inconsistencies between the data may be indicative of the presence of one or more issues or anomalies within the infrastructure.

In one illustrative embodiment of the present invention, a method comprises confirming when a vehicle accesses a region of interest, obtaining data associated within the region of interest, and determining, based on analytics performed on the data obtained of the region of interest, whether one or more anomalies are present at the region of interest. Obtaining data includes at least one of collecting, with an imaging sensor associated with the vehicle, image data of a given point of interest within the region of interest or collecting, with a motion sensor associated with the vehicle, motion data of the vehicle in a given fragment of interest within the region of interest. The confirming, obtaining and determining steps are performed by at least one processing device comprising a processor operatively coupled to a memory.

In another illustrative embodiment of the present invention, a system comprises a memory and at least one processor coupled to the memory and configured to confirm when a vehicle accesses a region of interest, obtain data associated with the region of interest, and determine, based on analytics performed on the data obtained of the region of interest, whether one or more anomalies are present at the region of interest. Obtaining data includes at least one of collecting, with an imaging sensor associated with the vehicle, image data of a given point of interest within the region of interest or collecting, with a motion sensor associated with the vehicle, motion data of the vehicle in a given fragment of interest within the region of interest.

In another illustrative embodiment of the present invention, a computer program product comprises a non-transitory computer readable medium encoded with computer executable code, the code configured to confirm when a vehicle accesses a region of interest, obtain data associated with the region of interest and determine, based on analytics performed on the data obtained of the region of interest, whether one or more anomalies are present at the region of interest. Obtaining data includes collecting, with an imaging sensor associated with the vehicle, image data of a given point of interest within the region of interest or collecting, with a motion sensor associated with the vehicle, motion data of the vehicle in a given fragment of interest within the region of interest.

Other embodiments will be described in the following detailed description of embodiments, which is to be read in conjunction with the accompanying figures.

DETAILED DESCRIPTION

Embodiments of the present invention provide a cognitive-based method, system and computer program product for detecting the presence of one or more anomalies within an infrastructure based on a comparison between historical and current data of the infrastructure. Moreover, upon detection of one or anomalies exceeding a predefined threshold(s), a response or notification is automatically generated and forwarded to a managing entity, for example, a municipality, in which the infrastructure is located.

According to some embodiments of the present invention, there is provided a cognitive-based methodology and system for detecting one or more anomalies within infrastructure. The infrastructure may include buildings, roadways, paths, highways, bridges, tunnels, dams, a factory or plant, a refinery, a retail building, a stadium, an outdoor facility, a park, a viaduct, a recreational area or any other public or private structures existing in a region of interest. The cognitive-based system includes the use of imaging sensors or devices and motion sensors to obtain current data of the infrastructure. The imaging sensors and motion sensors may be mounted to vehicles entering the region of interest. The vehicles may be motor vehicles, aircraft, bicycles, drones, or any other manned or unmanned vehicle. The one or more anomalies detected may be structural defects in the infrastructure which may require monitoring, intermittent repair or immediate corrective action. In illustrative embodiments, the structural defects are determined via imaging data captured, for example, by a camera mounted to one or more vehicles entering the region of interest. In other illustrative embodiments, the one or more anomalies may be defects or obstructions in a roadway which alter the traffic patterns causing either reduced or increased speeds of vehicles within a length of roadway or alterations in vehicle paths. Detecting the anomalies in roadways may be effected through mounting an accelerometer within the vehicle, or possibly with the use of Global Positions System (GPS) tracking.

In the text which follows, the term "region of interest" (ROI) includes any area in which infrastructure identified to be evaluated and monitored is located. The term "point of interest" (POI) includes any infrastructure within the region of interest (ROI) for which imaging data will be captured or collected to determine the integrity of the infrastructure. The term "fragment of interest" (FOI) will include a length of roadway within the region of interest (ROI) for which motion data will be captured or collected to determine obstructions or the like within the length of roadway. The term "corrective response" includes any action taken on behalf of the system resulting from a determination of the existence of one or more anomalies within the infrastructure, in accordance with the policy, and can include continue monitoring the infrastructure for a set period of time.

Illustrative embodiments may also obtain and evaluate historical data including imaging data and motion data of various infrastructure, and compare the historical data against current data collected by the vehicles to identify one or more anomalies within the infrastructure. In accordance with illustrative embodiments, determining whether an anomaly exists in the infrastructure may require the data of the structural defect or alteration in traffic pattern exceed a predefined threshold limit in accordance with an implemented policy.

In other illustrative embodiments, a vehicle tracking system such as a Global Positioning System (GPS) is utilized to track the location of the vehicle relative to the region of interest. GPS tracking may be inclusive of a GPS sensor/transmitter/receiver (hereinafter "GPS sensor") initially installed in the vehicle, subsequently installed in the vehicle, or may be incorporated within an Internet of Things (IoT) device disposed on, or within, the vehicle. The IoT device may be a smartphone, PDA, tablet, portable computer or the like. The vehicle is tracked via the GPS sensor whereby upon a determination that the vehicle is within the region of interest (ROI), the imaging sensor and/or motion sensor is automatically activated by the system. In illustrative embodiments, the imaging sensor is activated to collect multiple images of an infrastructure when the vehicle and imaging sensor, for example, a camera, is/are directly aligned with the point of interest (POI) as determined by GPS tracking In other illustrative embodiments, the motion sensor, for example, an accelerometer, is automatically activated upon entrance of the vehicle within the fragment of interest (FOI), for example, a length of roadway, and is automatically deactivated upon exiting the fragment of interest.

Illustrative embodiments also include collecting data from multiple vehicles over a predetermined time period, analyzing the data through the use of analytic software and/or algorithms, categorizing the data and incorporating the data as historical data of the infrastructure. In some aspects, the system or methodology may incorporate data filtering to define, detect and/or correct errors or outliners in the collected data, to thereby minimize the impact of these errors on the collected data and subsequent analyzes.

In certain illustrative embodiments, it is envisioned that separate entities, for example, individuals, corporations, etc. (hereinafter, "subscribers") may subscribe to the system via, for example, a downloadable application for an IoT, whereby their respective vehicles are utilized to collect data in accordance with the policy. Such subscribers may be compensated by, for example, a municipality, for the use of their vehicles in a data collection capacity. The municipality may provide the necessary sensors, GPS tracking, cameras, cellular access capabilities, WiFi, etc. within the vehicle of the subscriber. Measures may be taken to protect the identity of these subscribers by altering certain areas of the collected image data to avoid visualization of faces, license plates or the vehicle itself.

Illustrative embodiments overcome issues with conventional infrastructure inspection methodologies which are generally limited to manual inspection and the subsequent production of untimely and outdated reports. Moreover, conventional infrastructure methodologies are incapable of providing timely notification of one or more anomalies actively associated with an infrastructure which may present issues with regards to safety, cause further damage to the infrastructure and increase the expense of infrastructure repair. In general, conventional systems are devoid of a cognitive-based system capable of actively detecting one or more anomalies associated with an infrastructure, and employing a response(s) to the one or more anomalies in accordance with an implemented policy.

Figure 1:
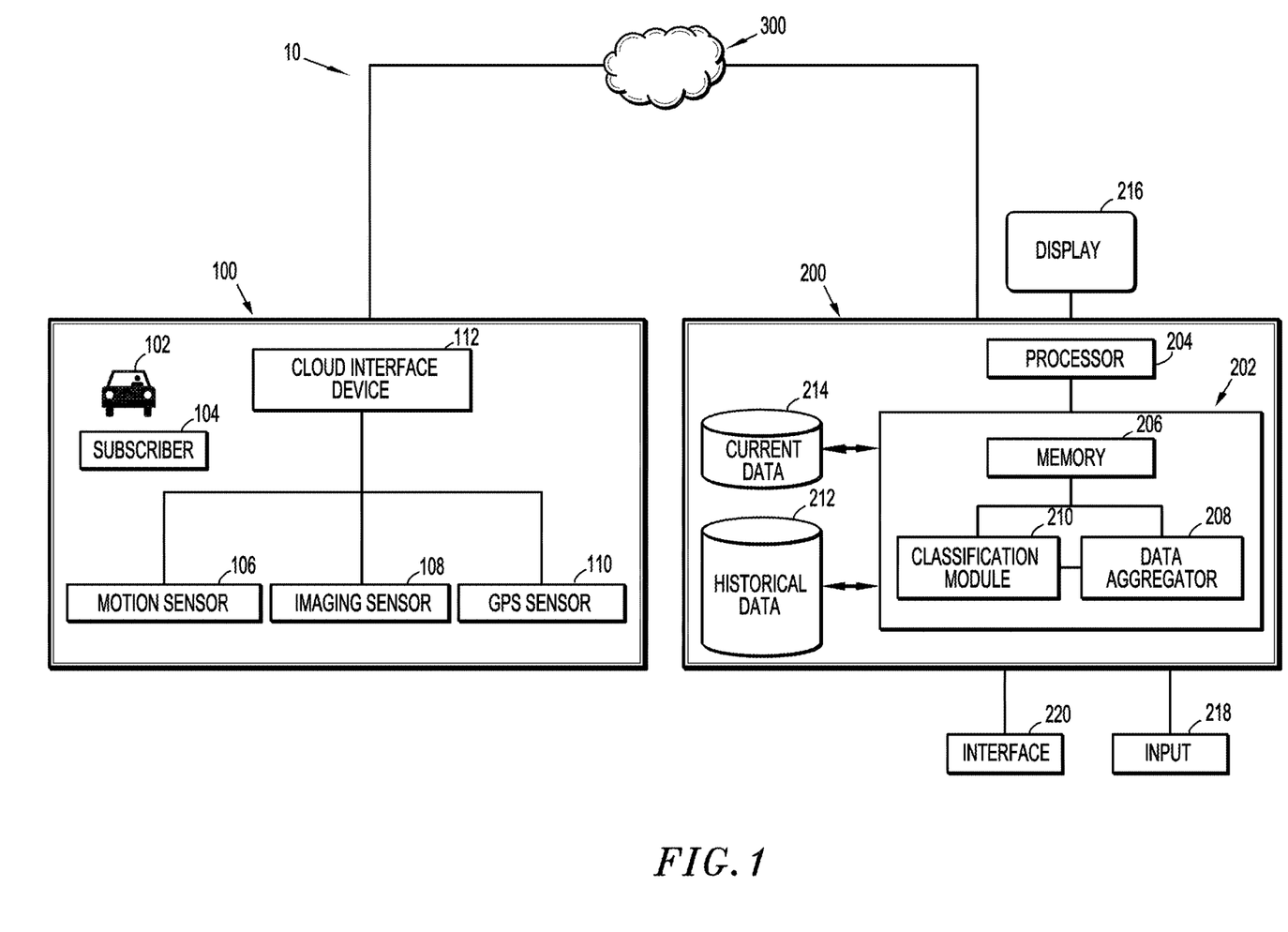
FIG. 1 illustrates an architecture of a cognitive-based system for inspecting infrastructure within a region of interest according to one or more embodiments of the invention.

Referring now to FIG. 1, there is illustrated one embodiment of the cognitive-based system 10 for detecting the presence of one or more anomalies within an infrastructure and initiating a remedial response according to an implemented policy. The system 10 monitors an infrastructure within a private or publicly owned region of interest (ROI). The infrastructure may be any structure, building including commercial or private, factory, roadway, path, tunnel, bridge, aqueduct, bike path, sidewalk, etc. within the region of interest. The system and methodology 10 may include essentially two functional components including a data collection component 100 and an anomaly or issue identifier component 200. Although these components 100, 200 are depicted as separate entities it is appreciated that there may be some elements which overlap, or that an element within one component may be embodied in the other component. It is further envisioned that the components 100, 200 may be combined.

The data collection component 100 is embodied in a vehicle 102 belonging to, or owned by, a subscriber 104 who has subscribed to the system 10 via, for example, a downloadable IoT application, or otherwise granted permission or registered to be affiliated with the system 10. The subscriber 104 may be compensated by an owner, manager, municipality, etc. seeking to collect data on the infrastructure within the region of interest (ROI). The vehicle 102 is capable of traversing the region of interest (ROI). As noted, such vehicle 102 may be a car, truck, unmanned vehicle, a drone, a bike, aircraft or any other vehicle which is manned or unmanned. The data collection component 100 further includes a motion or movement sensor 106, an imaging sensor 108 and a Global Positioning System (GPS) sensor or tracker 110 each of which is embodied in the vehicle 102 or within an IoT device disposed within the vehicle 102.

The motion or motion sensor 106 may be an accelerometer or speed sensor capable of detecting a rate of motion or movement of the vehicle through the region of interest (ROI), and provide data output (e.g., motion data or accelerometer data). In illustrative embodiments, the motion sensor 106 is an accelerometer which may be readily incorporated within any location in the vehicle 102. Alternatively, or additionally, the motion sensor 106 may include a wheel sensor or tachometer capable of detecting acceleration and/or speed of the vehicle 102. The motion sensor collects data. The imaging sensor 108 may include any number and/or combination of sensors that may capture image-related data (e.g., image data). In illustrative embodiments, the imaging sensor 108 includes a high definition camera which can be installed in the car, for example, on the dashboard, the front grill, roof, etc. Other imaging sensors 108 contemplated include optical sensors, infrared imaging sensors, ultraviolet imaging sensor, Light Detection and Ranging (LIDAR) sensors, Synthetic Aperture Radar (SAR) sensors, electromagnetic (EM) and/or acoustic sensors or any other sensor capable of producing one or more images of the infrastructure. The GPS sensor 110 may be a component of the GPS system initially installed in the vehicle or may be an aftermarket item installed for the subscriber 104 to track the location of the vehicle 102 relative to the region of interest (ROI). The GPS sensor 110 also may be embodied in the IoT device of the subscriber 102 disposed within the vehicle 102.

The data collection component 100 further includes a cloud interface device 112 in communication with at least one of the motion sensor 106, imaging sensor 108 and the GPS sensor 110. The cloud interface device 112 is in communication with the motion sensor 106, imaging sensor 108 and the GPS sensor 110 through wireless communication methodologies including Bluetooth or the like. The cloud interface device 112 may include a WLAN (wireless local area network) transmitter/receiver, or alternatively may incorporate cellular technology, for example, 4G or 5G, to transmit and receive data to and from a cloud platform 300. It is also envisioned that one or more of the motion sensor 106, imaging sensor 108 and the GPS sensor 110 may incorporate any of the aforementioned wireless transmission technologies to transmit collected data directly to the cloud platform 300. Furthermore, in illustrative embodiments, at least one or more of the motion sensor 106, imaging sensor 108 and the GPS sensor 110 may be linked to the subscribers IoT device within the vehicle where the IoT device is utilized to transmit and receive data to and from the cloud platform 300.

With continued reference to FIG. 1, the issue or anomaly identifier component 200 of the system 10 will be discussed. The anomaly identifier component 200 may be disposed remote from the vehicle 102. The anomaly identifier component 200 includes a computing device 202 which may be a desktop computer, a laptop computer, a smartphone or tablet device or any other Internet of Things (IoT) device, which in some illustrative embodiments, may be disposed within the vehicle 102. The computing device 202 includes a processor 204 and a memory 206 coupled to the processor 204. The memory 206 may be any type of storage medium accessible by the processor 204 and adapted to perform the functions and operations of the system 10. The memory 206 includes computer code, logic or software adapted to perform analytics on data received from the data collection component 100 and to perform the operations of the implemented policy of the system 10.

The computing device 202 further includes a data aggregator 208 and a classification module 210, each of which may be embodied within the software of the memory 206. The data aggregator 208 processes the data. For example, the data aggregator 208 may review the collected data samples incoming from the data collection component 100 and remove particular data items which are statistically outliers from a current sample pattern. For example, clustering algorithms or techniques (e.g., k-means) may be utilized to cluster similar data and remove sample outliers. The data aggregator 208 may employ a data filtering technique using multiple samples of collected data of infrastructure within the region of interest (ROI). Noise filtering algorithms like Median filter, Gaussian filter or Median Blending can be implemented to reduce noise from sampled data. This will improve the quality of collected data by leveraging the multiple samples taken by the data collection sensors. This process assists in removing data transient events that may impact the collected data. For instance, a flying bird passing in front of a public infrastructure may affect one or more images. However, it should be negligible when several vehicles sample data during a data acquisition period. The same concept is applied to the data collected from the accelerometers when a multitude of samples are taken within a given time period. One example of a suitable filtering methodology is disclosed in an article entitled "A Look at Reducing Noise in Photographs Using Median Blending," by Pat David (2013), the entire contents of which article is incorporated by reference herein.

In illustrative embodiments, the data aggregator 208 aligns all image and accelerometer patterns. Alignment is necessary so that images and accelerometer patterns have the same resolution and positioning. For the accelerometer data, the accelerometer readings are combined with the GPS data. Then, the accelerometer data gathered for the fragment of interest (FOI) is split into several configurable equally-spaced fragments, with accelerometer data associated with each fragment. For the image data, the data aggregator 208 applies a set of transformations to rotate and resize images to obtain aligned pictures. Examples of several known algorithms for aligning data are disclosed in an article entitled "Deep Alignment Network: A Conventional Neural Network for Robust Face Alignment," by Kowalski et al. (2017) and an article entitled "Learning to Align from Scratch," by Huang et al. (2012), the entire contents of each article being incorporated by reference herein.

The classification module 210 may include an artificial neural network, a support vector machine algorithm, machine learning model or any other pattern recognition model. The classification module 210 is configured to classify or delineate and assign the aggregated data to the infrastructure within various regions of interest. The classification model considers many parameters relative to the region of interest including time of day, season, historical movement, etc. for creating future forecasting Thus, for example, collected data for a particular point of interest (POI), for example, a building within a region of interest (ROI) is collected and categorized to this particular building. Alternatively, collected data for a fragment of interest (FOI), for example, a section of highway, is collected. The classification module 210 is able to categorize multiple data inputs or samples of infrastructure from a plurality of regions of interest, and for specific time periods including, for example, day, night or seasonal, etc. The classification module 210 is utilized to classify the aggregated data collected for subsequent forecasting purposes. The classification module may also utilize images from a given region of interest (ROI) or a fragment of interest (FOI) to find potential issues like rust, visible concrete iron, corrosion, or water infiltration. A database with these potential issues can be pre-loaded at system startup or annotated by users when using the service.

The computing device 202 further includes an historical data depository 212 and a current data depository 214. The historical data depository 212 stores historical data for the infrastructure within each region of interest (ROI) as classified, for example, by the classification module 210. The historical data depository 212 may also be used as a reference against which data samples to be analyzed by the data aggregator 208 are compared. The historical data is used in determining whether the analyzed current data qualifies as one or more anomalies. For example, historical data of a point of interest (POI) or a fragment of interest (FOI) within the region of interest (ROI) may be collected over a predetermined time period data, for example, hourly, daily, weekly, monthly or annually. Image data for a building as a point of interest (POI) may track the existence of a structural defect in the building such as a noticeable crack in the foundation. If collected current data when compared against the historical data indicates that the structural defect has increased in severity, for example, beyond an acceptable predefined threshold, a remedial response may be initiated. Similarly, historical data of a fragment of interest (FOI) such as a section of roadway may identify normal acceleration, speed and travel paths of the vehicle in the roadway section. If, however, current data of the vehicle behavior compares differently from the historical data, this may be suggestive that there exists some obstacle in the roadway section including, for example, the presence of new pot holes, a downed tree, flooding, a land slide, etc. The current data depository 214 receives current data from the data collection component 100. As will be discussed in greater detail hereinbelow, the current data collected for the infrastructure within a particular region of interest (ROI) and captured within the current data depository 214 is compared against the historical data within the historical data depository 212 to detect one or more anomalies within the infrastructure. The historical data depository 212 includes data pertaining to regular patterns of motion data and image data over periods of time, during particular weather patterns, seasonal data, etc. In addition, the historical data depository 212 may store historical data of prior issues/anomalies of the motion data and the image data. In illustrative embodiments, the historical data depository 212 and the current data depository 214 may occupy individual databases or the same database.

The computing device 202 further includes a video display 216. The display 216 may be a screen mounted to the computing device 202 or be external to the computing device 202. The display 216 will display data associated with the status(es) of infrastructure within regions of interest (ROI). The display 216 may be incorporated within the computing device 202, for example, when the computing device 202 includes a mobile phone, tablet, personal digital assistant (PDA), etc. More than one display 216 is also envisioned. The computing device 202 further includes an input 218 such as a keyboard, mouse, and/or a voice input. Alternatively, the input 218 may be incorporated on the display 206, for example, as a touch screen system. The computing device 202 further includes an interface 220 (e.g., wireless or electrical/mechanical connection such as a USB port or a CD-ROM) to permit import of program instructions to change, modify or alter the implemented policy of the system 10 in accordance with embodiments of the present invention.

The data collection component 100 and the issue identifier component 200 are in communication through the cloud-based platform 300. The cloud-based platform 300 may include a public or private cloud or a hybrid of public and private cloud platforms.

Figure 2:
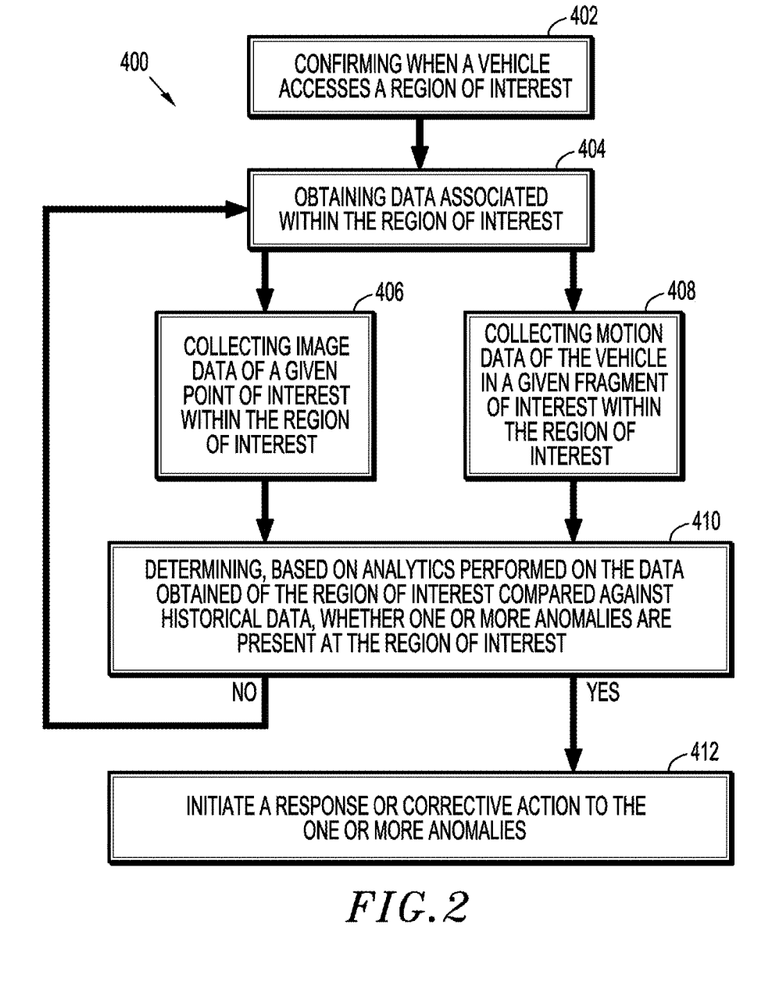
FIG. 2 is a flow chart of an exemplary methodology for inspecting infrastructure within the region of interest according to one or more embodiments of the present invention.

FIG. 2 is a flow chart of an exemplary methodology of use of the system 10. The method 400 includes confirming when a vehicle of a subscriber is entering or accessing a region of interest (ROI). (STEP 402). As noted above, confirmation may be ascertained via GPS tracking methodologies including the GPS sensor 110. Upon entering the region of interest, the motion and imaging sensors 106, 108 of the vehicle 102 may be activated. Thereafter, data is obtained from within the region of interest (ROI). (STEP 404). Depending on the targeted infrastructure within the region of interest (ROI), data may be obtained in accordance with at least two different methodologies. If the intended target is an infrastructure at a defined point of interest (POI), for example, a building or the like, the imaging sensor 108 (e.g., a camera) is utilized to obtain image data, preferably multiple images of the building. (STEP 406). In one illustrative embodiment, the camera will be activated when the camera within the vehicle is in alignment with the building. This may be determined by the GPS sensor 110 or other tracking mechanisms.

In the alternative, if the intended target within the region of interest (ROI) is a fragment of interest (FOI), for example, a section of a roadway, the motion sensor 106 will be activated when the vehicle 102 enters the fragment of interest (FOI) or the start of the roadway section to be analyzed, and continues until the vehicle 102 exits the fragment of interest (FOI) or the end of the roadway section. The motion sensor 106 (e.g., the accelerometer) will detect the acceleration and movement of the vehicle through the fragment of interest (FOI). (STEP 408). Thereafter, the data collected by either methodology is transferred to the anomaly detection component 200 of the system 10 for analysis. Analytics are performed on the data obtained from the region of interest (ROI) to detect the presence of one or more anomalies. As noted, the current data obtained by either methodology is compared against historical data to detect the existence of the one or more anomalies. (STEP 410). If the differences are minimal or do not reach a predefined threshold, the data may be incorporated within the historical database 212, and the process is continued. If one or more anomalies is confirmed, one or more responses will be initiated to address the anomaly. (STEP 412). One response with respect to the point of interest, for example, a building, may be to correct any defects in the structure of the point of interest, including providing reinforcement to the building, adding structural support, etc. With regard to the fragment of interest data, for example, a section of roadway, potholes which may have affected the driving pattern of the vehicles, as detected by the data obtained from the motion sensor 106, may be filled or addressed. Other anomalies and responses to address the anomalies are also envisioned including to remain idle and continue monitoring the region of interest (ROI).

The methodology 400 of FIG. 2 is repeated for multiple subscribers 102 and multiple vehicles 104 to obtain both historical data and current data.

Figure 3:
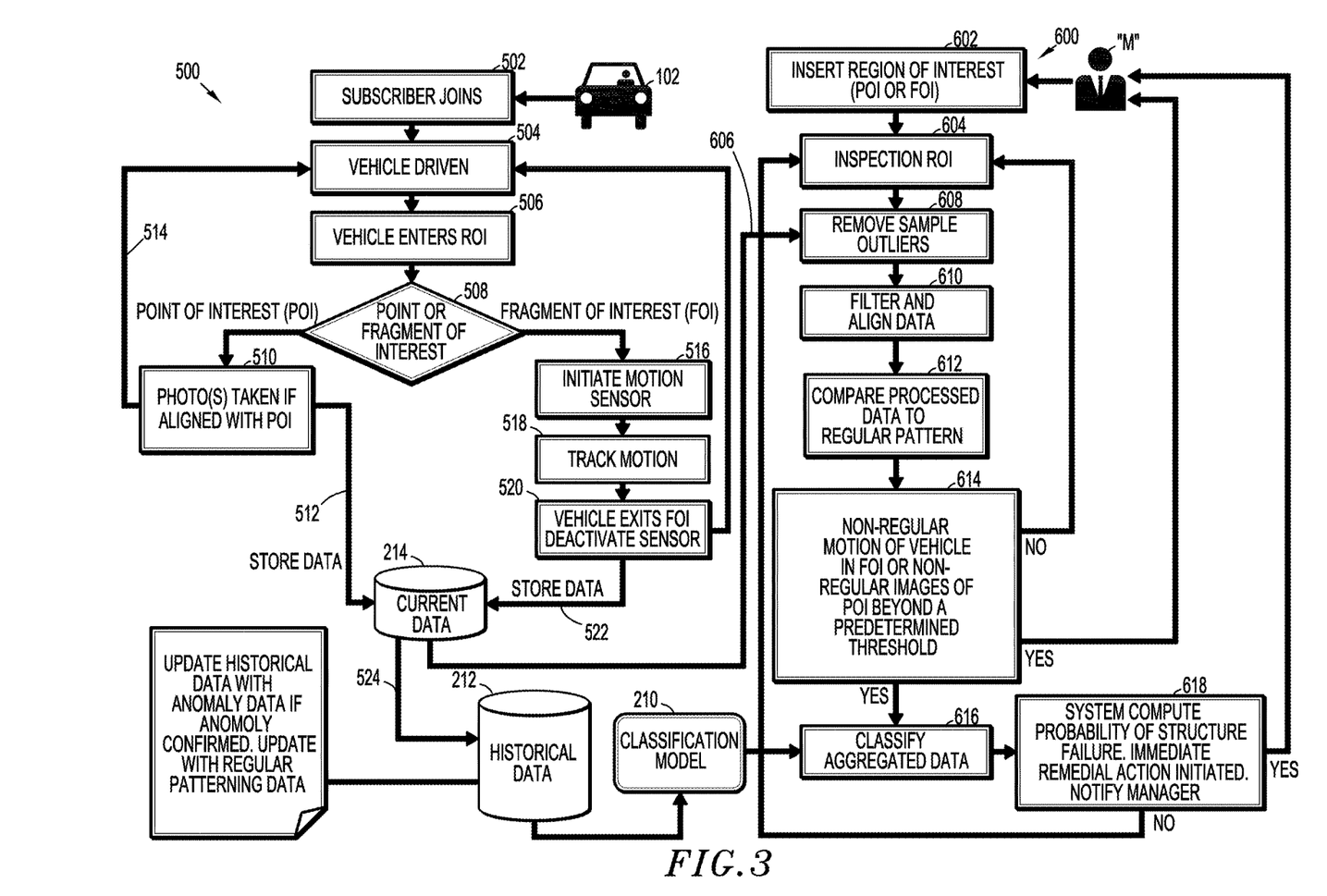
FIG. 3 is a flow chart of another exemplary methodology for inspecting infrastructure within the region of interest according to one or more embodiments of the present invention.

Referring now to the flow chart of FIG. 3, another exemplary methodology 500 of implementing the data collection component 100 of the system 10 is illustrated. In accordance with this methodology, a more detailed discussion of the data collection component 100 and the anomaly identifier component 200 is provided. The subscriber 102 joins the system 10 by downloading an application from the Internet, registering with, for example, a municipality, or any other conventional methodologies. (STEP 502). The vehicle is driven (STEP 504) and enters a region of interest (ROI) as determined by the GPS sensor 110 embodied in the vehicle 102 or embodied in an IoT device carried within the vehicle 102 (STEP 506) A determination is made whether the region of interest (ROI) includes a point of interest (POI) or a fragment of interest (FOI). (STEP 508) If the region of interest ROI is a point of interest POI, such as a building or the like, one or more photos are taken of the infrastructure provided the imaging sensor 108 (e.g., a camera) is aligned with the point of interest POI. (STEP 510). The one or more photos are stored in the current data depository 214. (STEP 512). The vehicle continues to drive within the region of interest (ROI) or into other areas. (STEP 514).

If the region of interest (ROI) is a fragment of interest (FOI), such as a section of roadway, the motion sensor 106 (e.g., an accelerometer) is activated upon entering the fragment of interest FOI as detected by the GPS sensor 110 of the vehicle 102, for example, the beginning of the roadway section. (STEP 516). The movement of the vehicle 102 including acceleration, speed, etc. is tracked by the motion sensor 106. (STEP 518). Once the vehicle 102 exits the FOI, for example, the end of the roadway section as identified by the GPS sensor 110, the motion sensor 106 is deactivated. (STEP 520). The motion data is stored in the current data depository 214. (STEP 522).

FIG. 3 also illustrates the historical data depository 212 discussed hereinabove. The historical data depository 212 includes historical data of regular patterning of data such as stored images of one or more points of interest (POI), when in a structurally acceptable condition, and data of the fragments of interest (FOI) during normal routine traffic patterning. The historical data depository 212 also may include data pertaining to one or more prior anomalies related to the points of interest (POI) or fragments of interest (FOI). The storing of data of prior anomalies may prove valuable when collected current data closely approximates the stored anomaly data. This may be indicative of the existence of a current anomaly similar to the prior anomaly. The historical data repository 212 and the current data depository 214 may occupy the same data base or be separate as shown. The collected current data may also be eventually stored in the historical data depository 212 (STEP 524). FIG. 3 further illustrates the classification model 210 (discussed hereinabove).

With continued reference to FIG. 3, a detailed exemplary methodology 600 of the anomaly or issue identifier component 200 of the system 10 will be discussed in detail. The manager "M" who may be an administrator, a representative of an entity, a municipality, or even a dedicated computer programmed to perform the functions of a manager "M", enters various regions of interest (ROI) including points of interest (POI) and fragments of interest (FOI) to be tracked or monitored. (STEP 602). Thereafter, a decision is made to inspect a region of interest (ROI) to ascertain the potential existence of any current anomalies. (STEP 604). Inspection is performed on these regions of interest (ROI) as discussed in connection with STEPS (504-520). The collected data from the current data depository 214 is forwarded or considered for inspection (STEP 606). For each region of interest (ROI), the data aggregator 208 removes outlier data samples (STEP 608), and aligns the data and reduces noise via the application of the various alignment and noise filtering algorithms discussed hereinabove (STEP 610). The processed data is compared to the regular pattern data stored in the historical data depository. (STEP 612). In STEP 614, a determination is made regarding the collected data. For example, in the event the motion sensor(s) 106 in the vehicle 102 detect irregular movement in the fragment of interest (FOI), for example, a roadway section or the like, or if the imaging sensor(s) 108 detect changes in the images in a point of interest (POI), for example, a building or the like, beyond a predetermined threshold ("YES" in the flowchart), the manager "M" is notified and corrective actions may or may not be initiated. If no changes are detected or changes are beyond a predetermined threshold ("NO" in the flowchart), the process returns to (STEP 604) In the event one or more anomalies are detected, the collected aggregated data is analyzed by the classification model 210. (STEP 616). The classification module 210 computes the degree or level of seriousness of the delta change in the data, to potentially forecast a probability of infrastructure failure, and recommend an action or alert based on the calculated severity. (STEP 618). A severe issue requiring immediate attention ("YES" in flowchart) is forwarded to the manager "M". Otherwise, the process is repeated.

The aforedescribed methodology 600 is exemplative of one illustrative embodiment of the present invention. It is noted that some of the steps may be combined or occur out of sequence than as presented herein.

Thus, the system 10 is capable of identifying one or more anomalies in regions of interest, qualify the anomalies and automatically initiate a message to a manager of the infrastructure in accordance with the implement policy. The message may range from continue monitoring the infrastructure or immediately initiate repair work based on forecasting performed by the classification model.

Embodiments of the present invention include a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more program code languages, including an object oriented program code language such as Python, C++, or the like, and procedural program code languages, such as the "C" program code language or similar program code languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
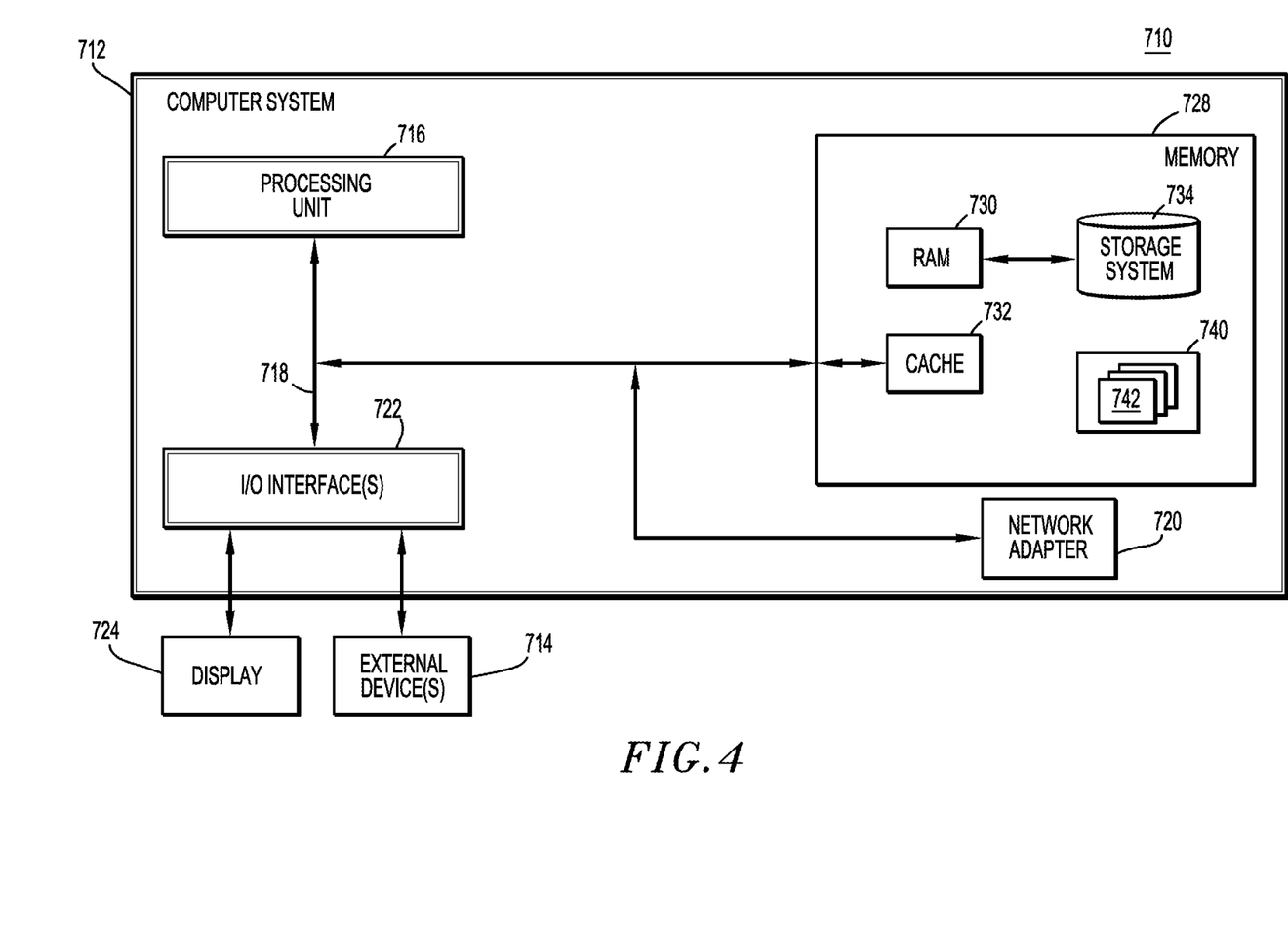
FIG. 4 illustrates a computer system in accordance with which one or more components/steps or techniques of the invention may be implemented according to one or more embodiments of the present invention.

One or more embodiments can make use of software running on a general-purpose computer or workstation. With reference to FIG. 4, in a computing node 710 there is a computer system/server 712, which is operational with numerous other general purposes or special purpose computing system environments or configurations. Examples of well-known computing systems, environments, and/or configurations that may be suitable for use with computer system/server 712 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, mobile and wearable devices, and distributed cloud computing environments that include any of the above systems or devices, and the like.

Computer system/server 712 may be described in the general context of computer system executable instructions, such as program modules, being executed by a computer system. Generally, program modules may include routines, programs, objects, components, logic, data structures, and so on that perform particular tasks or implement particular abstract data types. Computer system/server 712 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 712 in computing node 710 is shown in the form of a general-purpose computing device. The components of computer system/server 712 may include, but are not limited to, one or more processors or processing units 716, a system memory 728, and a bus 718 that couples various system components including system memory 728 to processor 716.

The bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 712 typically includes a variety of computer system readable media. Such media may be any available media that is accessible by computer system/server 712, and it includes both volatile and non-volatile media, removable and non-removable media.

The system memory 728 can include computer system readable media in the form of volatile memory, such as random-access memory (RAM) 730 and/or cache memory 732. The computer system/server 712 may further include other removable/non-removable, volatile/nonvolatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 718 by one or more data media interfaces. As depicted and described herein, the memory 728 may include at least one program product having a set (e.g., at least one) of program modules that are configured to carry out the functions of embodiments of the invention. A program/utility 740, having a set (at least one) of program modules 742, may be stored in memory 728 by way of example, and not limitation, as well as an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the invention as described herein.

Computer system/server 712 may also communicate with one or more external devices 714 such as a keyboard, a pointing device, a display 724, etc., one or more devices that enable a user to interact with computer system/server 712, and/or any devices (e.g., network card, modem, etc.) that enable computer system/server 712 to communicate with one or more other computing devices. Such communication can occur via I/O interfaces 722. Still yet, computer system/server 712 can communicate with one or more networks such as a LAN, a general WAN, and/or a public network (e.g., the Internet) via network adapter 720. As depicted, network adapter 720 communicates with the other components of computer system/server 712 via bus 718. It should be understood that although not shown, other hardware and/or software components could be used in conjunction with computer system/server 712. Examples include, but are not limited to, microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using program code languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
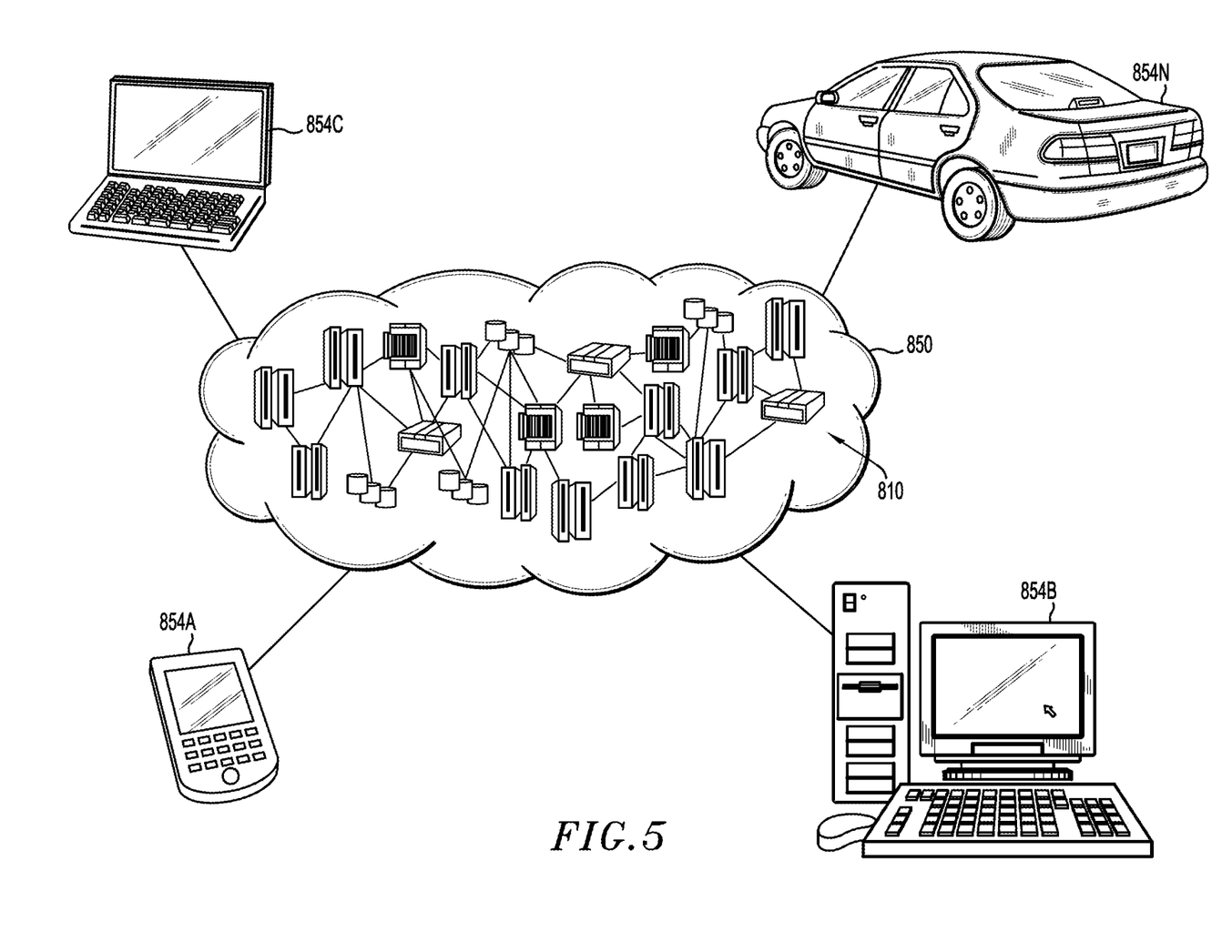
FIG. 5 illustrates a cloud computing environment according to one or more embodiments of the present invention.

Referring now to FIG. 5, illustrative cloud computing environment 850 is depicted. As shown, cloud computing environment 850 includes one or more cloud computing nodes 810 with which local computing devices used by cloud consumers, such as, for example, personal digital assistant (PDA) or cellular telephone 854A, desktop computer 854B, laptop computer 854C, and/or automobile computer system 854N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-N shown in FIG. 5 are intended to be illustrative only and that computing nodes 810 and cloud computing environment 850 can communicate with any type of computerized device over any type of network and/or network addressable connection (e.g., using a web browser).

Figure 6:
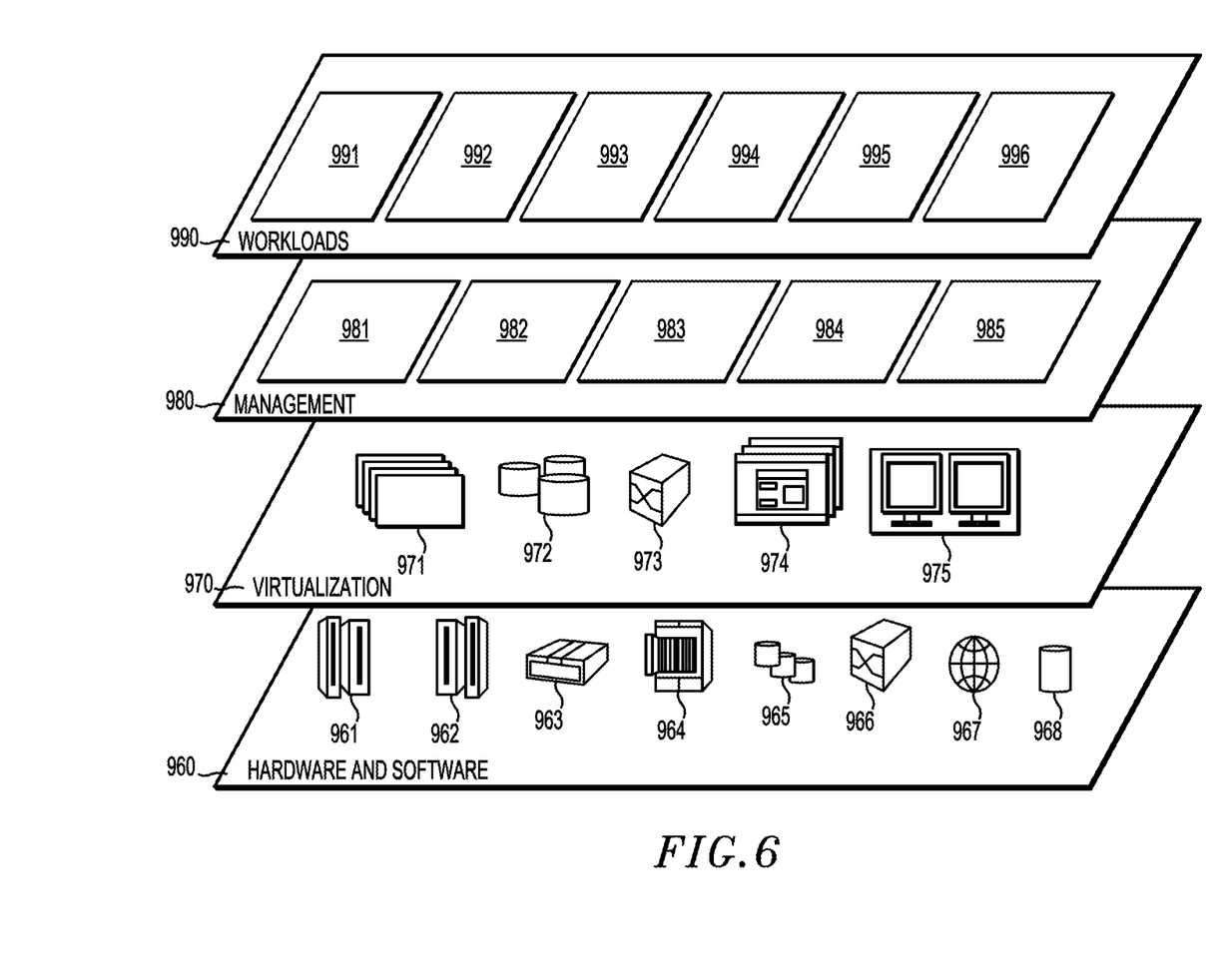
FIG. 6 illustrates abstraction model layers according to one or more embodiments of the present invention.

Referring now to FIG. 6, a set of functional abstraction layers provided by cloud computing environment 850 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 960 include hardware and software components. Examples of hardware components include: mainframes 961; RISC (Reduced Instruction Set Computer) architecture-based servers 962; servers 963; blade servers 964; storage devices 965; and networks and networking components 966. In some embodiments, software components include network application server software 967 and database software 968.

Virtualization layer 970 provides an abstraction layer from which the following examples of virtual entities may be provided: virtual servers 971; virtual storage 972; virtual networks 973, including virtual private networks; virtual applications and operating systems 974; and virtual clients 975.

In one example, management layer 980 may provide the functions described below. Resource provisioning 981 provides dynamic procurement of computing resources and other resources that are utilized to perform tasks within the cloud computing environment. Metering and pricing 982 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 983 provides access to the cloud computing environment for consumers and system administrators. Service level management 984 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 990 provides examples of functionality for which the cloud computing environment may be utilized. Examples of workloads and functions which may be provided from the workload layer 990 include collecting historical data of a region of interest 991, collecting current data of the region of interest (ROI) 992, comparing the current data against the historical data 993, identifying one or more anomalies within the region of interest (ROI) based on the comparison of the data 994, executing a classification model on the aggregated data to compute a probability of structure failure of the region of interest (ROI) 995, and notifying a manager overseeing the region of interest (ROI) 996 in accordance with the implemented policy using the methodologies and techniques described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   obtaining, with a vehicle, data associated with a region of interest, the obtaining data including at least one of:
      collecting, with an imaging sensor associated with the vehicle, image data of a given point of interest within the region of interest; and
      collecting, with a motion sensor associated with the vehicle, motion data of the vehicle in a given fragment of interest within the region of interest; and
   determining, based on analytics performed on the data obtained of the region of interest, whether one or more anomalies are present at the region of interest;
   wherein obtaining data associated with a region of interest comprises activating the imaging sensor and the motion sensor in association with entrance of the vehicle into the region of interest, and deactivating the imaging sensor and the motion sensor in association with exiting of the vehicle from the region of interest, as detected by at least one of a geographical positioning system, a tracking device or a location service, associated with the vehicle;

wherein determining whether one or more anomalies are present includes comparing the data obtained of the region of interest against historical data of the region of interest collected over a predetermined period of time; and wherein the steps are performed by at least one processing device comprising a processor operatively coupled to a memory.

2. The method of claim 1 including initiating a response upon determining a presence of one or more anomalies within the region of interest.

3. The method of claim 1 wherein obtaining data includes collecting, with the imaging sensor, the image data of the given point of interest, the given point of interest including infrastructure.

4. The method of claim 3 wherein determining whether one or more anomalies are present includes comparing the image data against historical image data of the infrastructure.

5. The method of claim 4 wherein collecting the image data is performed by a camera mounted to the vehicle.

6. The method of claim 1 wherein obtaining data includes collecting, with the motion sensor, motion data of the vehicle in a given fragment of interest, the given fragment of interest including a length of roadway.

7. The method of claim 6 wherein determining whether one or more anomalies are present includes comparing the motion data against historical motion data of vehicles which previously traveled the length of roadway.

8. The method of claim 7 wherein collecting the motion data is performed with at least one motion sensor mounted to the vehicle.

9. The method of claim 8 wherein the motion sensor is an accelerometer mounted to the vehicle.

10. The method of claim 1 further comprising confirming when the vehicle accesses the region of interest with the at least one of a geographical positioning system, a tracking device or a location service associated with the vehicle.

11. The method of claim 1 including filtering and aligning the data via one or more algorithms.

12. The method of claim 1 wherein the historical data comprises one or more prior anomalies detected in the region of interest, and wherein determining whether one or more anomalies are present comprises comparing the collected data obtained by the vehicle against the historical data of the one or more prior anomalies to identify similarities between the collected data and the historical data.

13. A system, comprising:
a memory;
at least one processor coupled to the memory and configured to:
obtain, with a vehicle, data associated with a region of interest, including at least one of:
collect, with an imaging sensor associated with the vehicle, image data of a given point of interest within the region of interest; and
collect, with a motion sensor associated with the vehicle, movement data of the vehicle in a given fragment of interest within the region of interest; and
determine, based on analytics performed on the data obtained of the region of interest, whether one or more anomalies are present at the region of interest;
wherein obtaining data associated with a region of interest comprises activating the imaging sensor and the motion sensor in association with entrance of the vehicle into the region of interest, and deactivating the imaging sensor and the motion sensor in association with exiting of the vehicle from the region of interest, as detected by at least one of a geographical positioning system, a tracking device or a location service, associated with the vehicle; and
wherein determining whether one or more anomalies are present includes comparing the data obtained of the region of interest against historical data of the region of interest collected over a predetermined period of time.

14. The system of claim 13 wherein obtaining data includes to collect, with the imaging sensor, the image data of the given point of interest, the given point of interest including infrastructure and wherein determining whether one or more anomalies exist includes comparing the image data against historical image data of the infrastructure.

15. The system of claim 14 wherein the image data is collected by a camera mounted to the vehicle.

16. The system of claim 13 wherein obtaining data includes to collect, with the motion sensor, motion data of the vehicle in a given fragment of interest, the given fragment of interest including a length of roadway and wherein determining whether one or more anomalies are present includes comparing the motion data of the data against historical motion data of vehicles within the length of roadway.

17. The system of claim 16 wherein the motion data is collected by an accelerometer mounted to the vehicle.

18. The system of claim 13 further comprising confirming when the vehicle accesses the region of interest with the at least one of a geographical positioning system, a tracking device or a location service associated with the vehicle.

19. The system of claim 13 including initiating a response upon determining a presence of one or more anomalies within the region of interest.

20. A computer program product comprising:
a non-transitory computer readable medium encoded with computer executable code, the code configured to:
obtain, with a vehicle, data associated with a region of interest, including at least one of:
collect, with an imaging sensor associated with the vehicle, image data of a given point of interest within the region of interest; and
collect, with a motion sensor associated with the vehicle, movement data of the vehicle in a given fragment of interest within the region of interest; and
determine, based on analytics performed on the data obtained of the region of interest, whether one or more anomalies are present at the region of interest:
wherein obtaining data associated with a region of interest comprises activating the imaging sensor and the motion sensor in association with entrance of the vehicle into the region of interest, and deactivating the imaging sensor and the motion sensor in association with exiting of the vehicle from the region of interest, as detected by at least one of a geographical positioning system, a tracking device or a location service, associated with the vehicle; and
wherein determining whether one or more anomalies are present includes comparing the data obtained of the region of interest against historical data of the region of interest collected over a predetermined period of time.

* * * * *